United States Patent [19]

Sakurai

[11] 4,092,389

[45] May 30, 1978

[54] METHOD OF BLOW MOLDING AND THEN EXHAUSTING HOLLOW PLASTIC ARTICLES

[75] Inventor: Eishiro Sakurai, Yokohama, Japan

[73] Assignee: Toyo Seikan Kaisha Ltd., Japan

[21] Appl. No.: 636,642

[22] Filed: Dec. 1, 1975

Related U.S. Application Data

[63] Continuation of Ser. No. 456,197, Mar. 29, 1974, abandoned.

[30] Foreign Application Priority Data

Apr. 28, 1973   Japan ............................ 48-47364

[51] Int. Cl.² .......................................... B29C 17/07
[52] U.S. Cl. ........................................ 264/89; 264/99; 425/535
[58] Field of Search ............ 264/89, 90, 92, 94, 264/96, 97, 98, 99; 425/DIG. 204, 522, 535, 536, 540

[56] References Cited

U.S. PATENT DOCUMENTS

| | | | |
|---|---|---|---|
| 3,089,185 | 5/1963 | Di Settembrini | 264/98 |
| 3,205,287 | 9/1965 | Di Settembrini | 425/DIG. 204 |
| 3,305,891 | 2/1967 | Kenichinozaki | 264/99 X |
| 3,337,911 | 8/1967 | Di Settembrini | 264/98 X |
| 3,338,998 | 8/1967 | Di Settembrini | 425/DIG. 204 |
| 3,488,803 | 1/1970 | Cote | 425/DIG. 204 |
| 3,571,848 | 3/1971 | Szajna | 425/DIG. 204 |

*Primary Examiner*—Jan H. Silbaugh
*Attorney, Agent, or Firm*—Wenderoth, Lind & Ponack

[57] ABSTRACT

In a method of manufacturing a hollow plastic molded article wherein a unit parison is accommodated in a metal mold and pressurized gas is admitted into the unit parison for blow molding the same, pressurized gas is ejected to the outside of the wall of the unit parison for forming an inlet port through the wall thereby blowing the pressurized gas into the unit parison through the inlet port thereby blow molding the unit parison.

3 Claims, 18 Drawing Figures

METHOD OF BLOW MOLDING AND THEN EXHAUSTING HOLLOW PLASTIC ARTICLES

This is a continuation of application Ser. No. 456,197, filed Mar. 29, 1974, now abandoned.

BACKGROUND OF THE INVENTION

This invention relates to a method of manufacturing hollow plastic articles such as bottles, and more particularly to a method of molding hollow plastic articles by using a rotary type automatic molding machine for continuously molding hollow plastic articles (for the sake of brevity hereinafter merely termed a rotary type hollow article molding machine) of the type wherein parisons are sequentially clamped by metal mold halves, and pressurized gas is blown into the parisons for urging them to the inner walls of the metal mold halves, said method is characterized by blowing the pressurized gas against the walls of the parisons thereby forming openings through the walls adapted to blow the pressurized gas into the parisons without using a hollow needle as the prior art method.

A prior art method of manufacturing a hollow article of thermoplastic material, for example a bottle, comprises the steps of melting the plastic material, extruding the molten plastic material into a tube, usually called a parison, clamping the parison by means of a pair of metal mold halves which cooperate each other to define a bottle shaped cavity, compressing the upper and lower ends of the parison to form a sealed parison unit, piercing the wall of the parison with a hollow needle and blowing pressurized gas into the parison for expanding the same against the inner wall of the closed metal mold halves. The bottle thus molded is then cooled and removed from the mold by opening the mold halves. The blow of the pressurized gas into the parison through the hollow needle is usually performed by reciprocating the needle in the transversal direction of the parison.

The method of blowing by using the reciprocating hollow needle accompanies various disadvantages including a decrease in the production efficiency and increase in the rejects.

More particularly, although the parison is prepared by extruding molten plastic, it is already cooled and solidifies substantantially until the hollow needle is operated so that it is necessary to make sharp the operating end of the hollow needle for the purpose of attaining positive piercing. When the hollow needle having such a sharp operating end is used repeatedly, the sharp end wears-out to decrease the piercing ability. In certain cases, the hollow needle often breaks so that it is necessary to exchange the broken needle with a new one thus requiring interruption of the molding operation.

When the hollow needle is worn out or broken in this manner, insufficient piercing will be resulted because the hollow needle is reciprocated with a constant stroke. Consequently the quantity of the pressurized gas blown into the parison decreases and in an extreme case it is impossible to blow thus increasing the number of rejects. Even when the operating end of the hollow needle is sufficiently sharp, due to the elasticity of the solidified parison its side wall will be deformed radially inwardly thus preventing perfect piercing. Under such circumstances, an unsatisfactory product is obtained in which the pierced portion has been greatly deformed.

Figure 1:
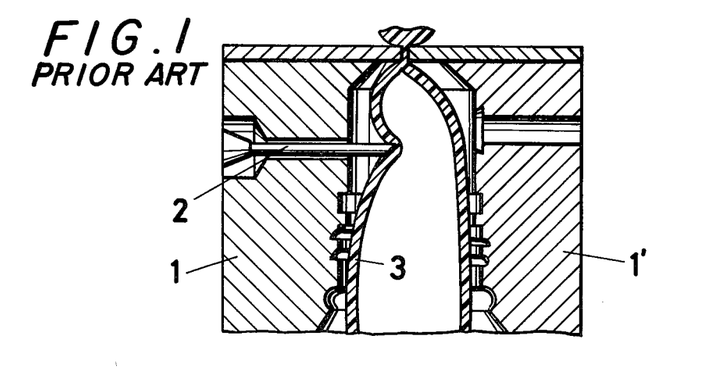
FIG. 1 shows a partial longitudinal view of closed metal mold halves and a parison contained therein showing one example of the manner of forming a reject in a prior art molding machine

One example of such a reject is illustrated in FIG. 1 of the accompanying drawings in which metal mold halves are designated by reference numerals 1 and 1'. FIG. 1 shows a hollow needle 2 reciprocated transversely into and out of the mold but does not sufficiently pierce through the side wall of a hollow parison 3 thus failing to blow perfectly.

Figure 2:
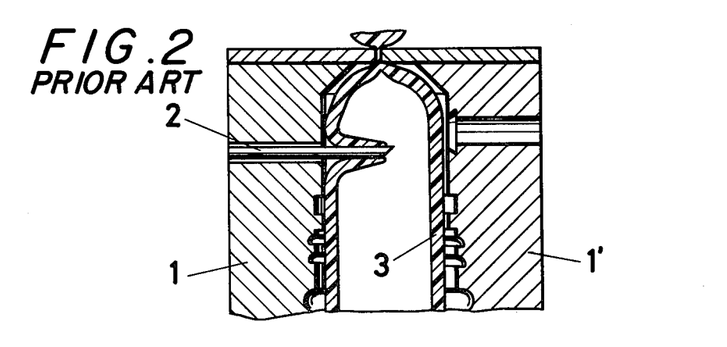
FIGS. 2 and 3 are views similar to FIG. 1 showing another examples of forming rejects.
Figure 3:
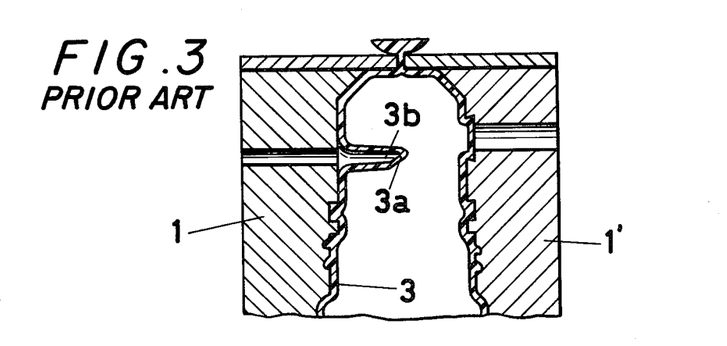

FIGS. 2 and 3 illustrate other examples of forming rejects. In the case shown in FIG. 3, the hollow needle 2 pushes inwardly the side wall of the not yet completely solidified parison 3 to form a protrusion 3a. However, since the diameter of the protrusion 3a is small since the thickness of the wall thereof is thin, this thin wall acts as a valve for closing the opening 3b at the operating end of the hollow needle thus preventing the flow of the pressurized gas which is supplied after the hollow needle 2 has been advanced. This may cause rupture or deformation of the hollow molded article when the mold halves 1 and 1' are opened while a high internal pressure is being applied.

SUMMARY OF THE INVENTION

Accordingly, it is an object of this invention to provide a novel method of manufacturing hollow plastic articles by using a rotary type molding machine capable of efficiently preventing the formation of rejects at the time of blowing pressurized gas into the parison accommodated in a metal mold.

Another object of this invention is to provide an improved method of molding hollow plastic articles capable of reducing the number of rejects and improving the efficiency of operation.

According to this invention, there is provided a method of manufacturing a hollow plastic molded article of the class wherein plastic material is extruded into a tube which is utilized to form unit parisons, each unit parison is accommodated in a closed metal mold having a cavity therein conforming to the contour of the molded article, the upper and lower ends of the unit parison accommodated in the metal mold are sealed pressurized gas is admitted into the sealed parison for blow molding the same in the cavity, then the molded article is cooled and taken from the metal mold, characterized in that pressurized gas is ejected to the outside of the wall of the unit parison for forming an inlet port through the wall of the unit parison, thereby blowing the pressurized gas into the unit parison through the inlet port.

According to another feature of this invention, an exhaust port is formed through the portion of the molded article which is to be cut away later by the internal pressure which is raised after completion of the blow molding operation whereby the pressurized gas is exhausted through the exhaust port thus enhancing the cooling of the molded article and the metal mold.

BRIEF DESCRIPTION OF THE DRAWINGS

Further objects and advantages of the invention can be more fully understood from the following detailed description taken in conjunction with the accompanying drawings in which.

DESCRIPTION OF THE PREFERRED EMBODIMENTS

Figure 4:
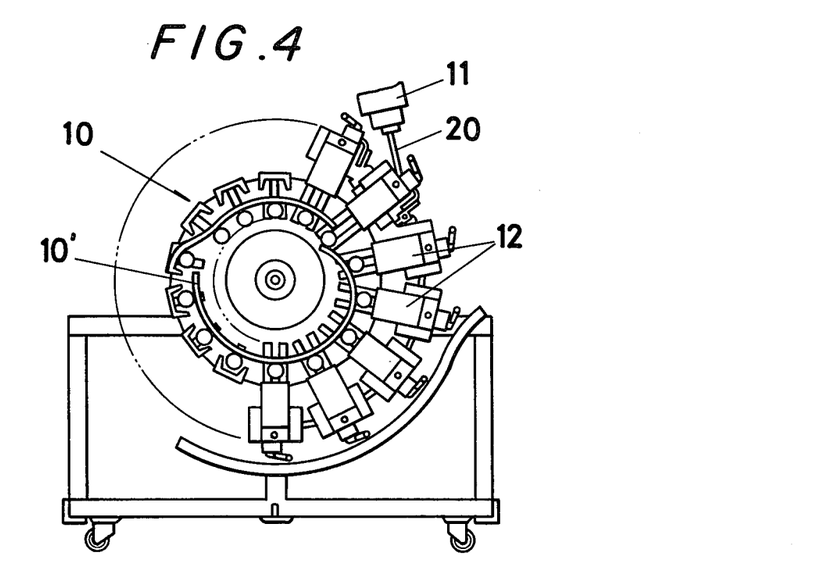
FIG. 4 is a diagrammatic plan view of an improved hollow plastic article molding machine utilized to carry out the method of this invention.

FIG. 4 of the accompanying drawings diagrammatically shows a plan view of a conventional rotary type hollow plastic article molding machine 10, which includes a plurality of metal molds 12 which are mounted about a turret 10' at an equal spacing, each metal mold comprising a pair of mold halves which are opened and closed for molding.

As will be described later more in detail, during the rotation of the turret 10' each pair of mold halves is closed to define a cavity having the same contour as the molded article so as to accommodate a length of a tube expanded by an extruder 11 thus forming a unit parison 20. Then, pressurized gas is blown into the parison for molding it into a desired configuration. After cooling, the mold halves are opened to take out the molded bottle. The operation described hereinabove is well known to those skilled in the art so that it is considered unnecessary to describe it in detail.

Figure 5:
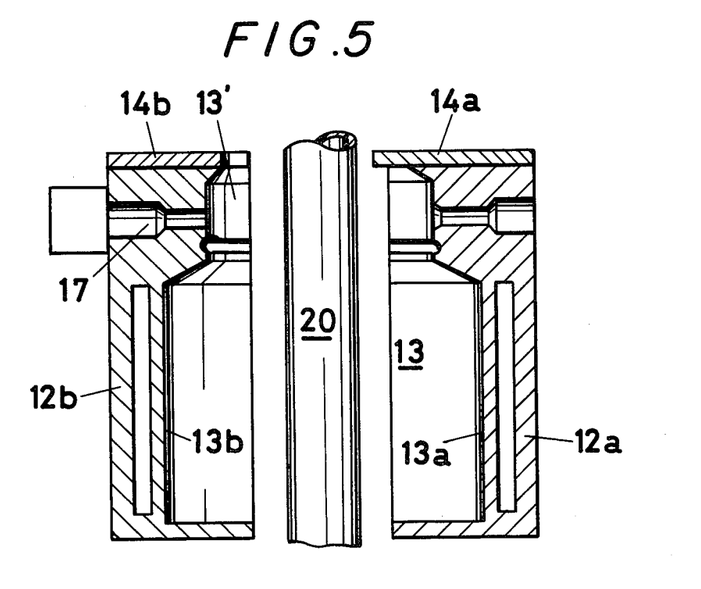
FIG. 5 is an enlarged longitudinal sectional view of the opened mold halves utilized in the molding machine shown in FIG. 4.

As shown in FIG. 5, each metal mold 12 comprises a pair of mold halves 12a and 12b having depressions 13a and 13b which cooperate to form a cavity 13 conforming to the outer contour of the molded product when the mold halves are closed. Above the cavity 13 is formed a second cavity 13' conforming to the outer contour of the neck of the bottle or the gas inlet portion which is to be cut off after molding.

Figure 6:
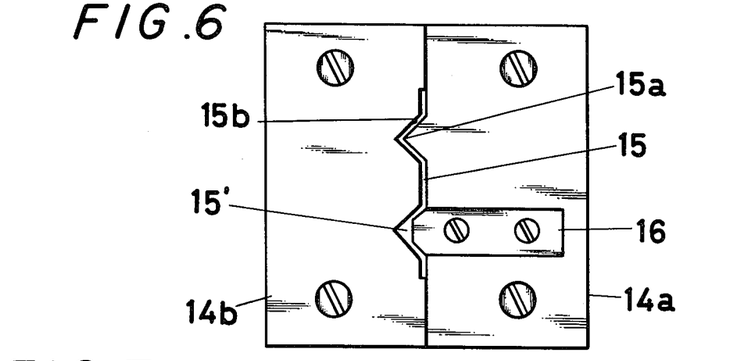
FIG. 6 shows a plan view of the mold halves in the closed condition.
Figure 7A:
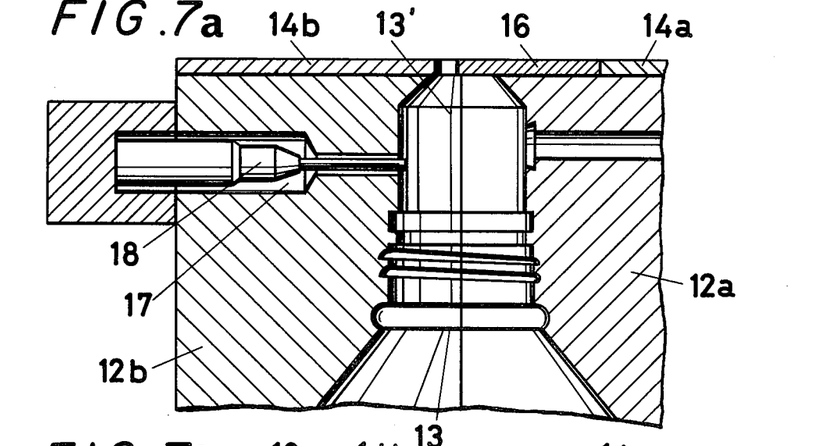
FIG. 7a shows an enlarged longitudinal section of a portion of the mold halves.

The molding halves 12a and 12b are provided at their upper ends with clamping plates 14a and 14b, respectively, adapted to clamp the upper end of the parison when the mold halves are closed. The upper and lower ends of the parison accommodated in the metal mold are sealed by the clamping plates 14a and 14b and the bottom plates of the mold halves. As shown in FIG. 6 the clamping plates 14a and 14b are constructed to form a gap 15 therebetween when the mold halves are closed, the gap being proportioned to assure a predetermined thickness of the parison. In the example shown, the opposing ends of the clamping plates are serrated as at 15a and 15b. One tooth of the serration 15a is removed for mounting a flat end adjusting member 16 and a valley of the serration 15'. As shown in FIG. 7, a transverse through opening 17 is formed through the upper portion of the mold half 12b to reach the second cavity 13', and a nozzle tube 18 for admitting compressed gas is adjustably contained in the through opening 17 with its inner end slightly projected into the second cavity 13. The opposite or outer end of the nozzle tube 18 is connected to a source of pressurized gas, for example air. The inner end of the nozzle tube is terminated with a flat surface perpendicular to the axis of the tube or with a round surface, instead of terminated with a needle like sharp end. The longitudinal adjustment of the nozzle tube 18 is made such that the flow of the pressurized gas will not be rendered intermittently. Although different depending upon the thickness of the wall of the parison it is advantageous to make the nozzle tube 18 to protrude into the second cavity 13' by about 2 to 5 mm.

The mold constructed as described above operates as follows. Referring again to FIG. 4 the sections of the thermoplastic tube extruded by extruder 11 are successively accommodated in a plurality of metal molds while the tube is still in a semi-solid state. Accordingly, each mold contains a unit parison 20. When the mold halves are closed the upper end of the parison 20 is sealed by the clamping plates 14a and 14b whereas the lower end is sealed by the bottom plates of the mold halves. When the nozzle tube 18 is advanced, a valve, not shown, is opened to eject compressed gas supplied from the source of the compressed gas from the inner end of the nozzle tube against the wall of the parison 20.

Figure 7B:
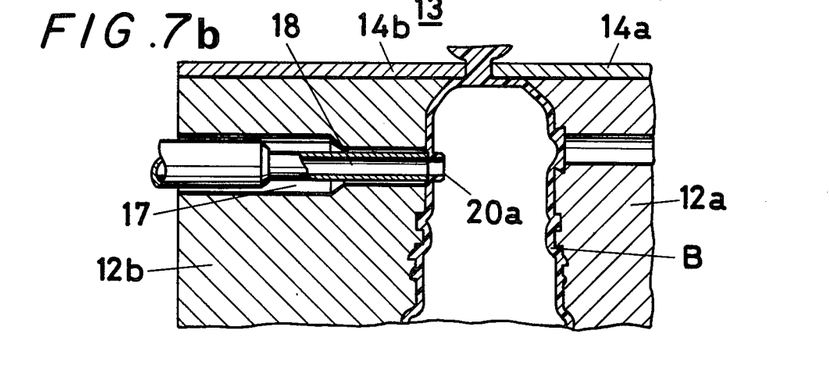
FIG. 7b is a view similar to FIG. 7a showing a condition under which a gas inlet opening has been opened and the article has been molded.

By the pressure of the pressurized gas, a gas inlet opening 20a is formed through the side wall of the parison, as shown in FIG. 7b so that the parison is inflated against the inner wall of the cavity 13 defined in the closed mold halves thus molding a hollow article B.

The molding operation continues while the given metal mold 12 is rotated along a portion of the periphery of the turret 10' which supports a plurality or metal molds 12. Thereafter, the metal mold 12 is cooled and opened to discharge the molded article B. This cycle is repeated in a manner well known in the art.

Figure 8:
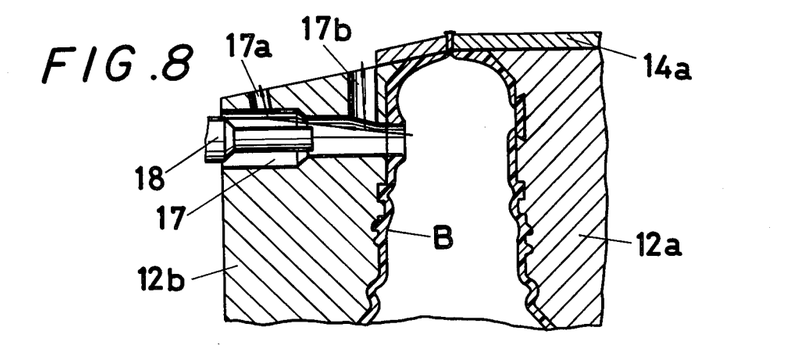
FIG. 8 is a view similar to FIG. 7 but showing a modified example in which exhaust openings are provided for the metal mold shown in FIG. 7.

FIG. 8 shows a modification of this invention in which a portion of the metal mold 12 is modified. Thus, exhaust passages 17a and 17b are provided for the through opening 17 at right angles thereto for the purpose of facilitating the escape of the pressurized gas which has been blown into the parison 20 as the nozzle tube 18 is retracted. This arrangement can exhaust more rapidly the pressurized gas out of the molded article B thus improving the efficiency of the molding operation.

Figure 9A:
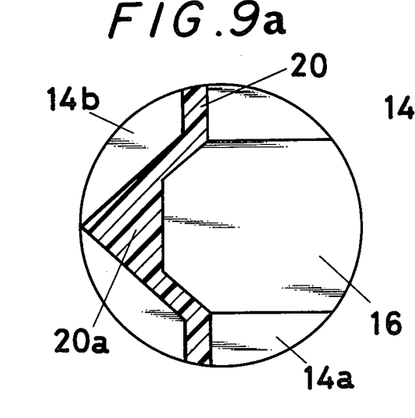
FIGS. 9a, 9b and 9c are diagrams showing the manner of forming an exhaust opening by the internal pressure prevailing in the molded article.
Figure 9B:
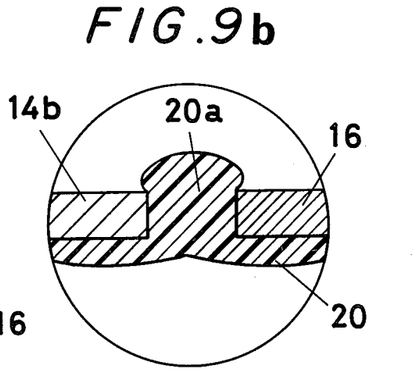
Figure 9C:
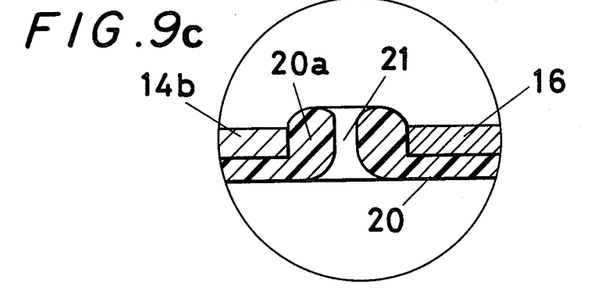

For the purpose of cooling more rapidly the molded article according to this invention, the following considerations are made. More particularly, as shown in FIG. 6, a portion of the gap 15 between the clamping plates 14a and 14b is widened as at 15' by providing a flat end adjusting member 16. When the clamping plates 14a and 14b are made relatively thick, as shown in FIG. 9, at the widened portion 15' there is formed a relatively thick clamped portion 20a of the parison. Since the parison is still in the semisolid state at the time of blow molding, an exhaust port 21 will readily be formed through this portion 20a shown in FIG. 9c. Since this port 21 functions to exhaust the pressurized gas by continuing the supply of the pressurized gas, it is possible to enhance the cooling of the molded article B as well as the metal mold. More particularly, the widened portion 15' between the clamping plates 14a and 14b forms a thick clamped portion 20a of the parison which is relatively difficult to cool. As the supply of the pressurized gas is continued, the pressure in the parison is rapidly increased to a value sufficient to blow mold the parison. When the internal pressure exceeds a predetermined limit, the thick clamped portion 20a which is difficult to cool and is still maintained in the semi-solid plastic state punctures to form the exhaust opening 21, thereby assuring positive exhaust.

With this method of exhausting, since the internal pressure at which the exhaust opening 21 is formed is extremely higher than the ordinary molding pressure, the gas will be exhausted after completion of the blow molding operation. This eliminates the prior art defect of exhausting before completion of the blow molding operation.

Figure 10A:
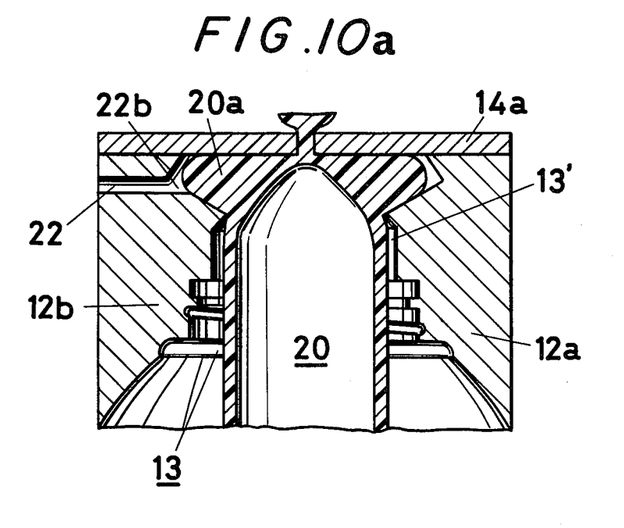
FIGS. 10a and 10b are partial longitudinal sectional view of the metal mold halves and a cross-sectional view thereof showing another example of forming an exhaust opening by utilizing the internal pressure.
Figure 10B:
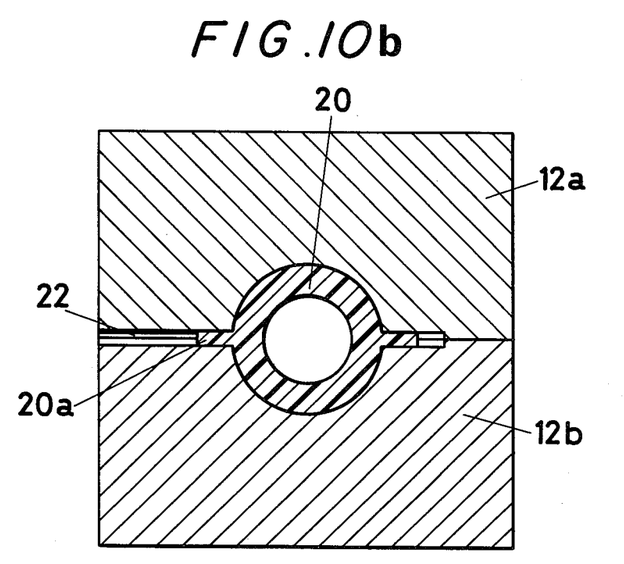

FIGS. 10a and 10b show a modified arrangement of the exhaust opening. In this modification, at the upper portions of the metal mold halves 12a and 12b are formed a relatively wide space 22b at the closed upper end of the parison and a transversal opening 22 communicating the space 22b to the outside, the wide space 22b serving to form a relatively thick portion 20a of the parison. As before, this thick portion 20a will not be ruptured until completion of the blow molding operation but as the internal pressure rises, the thickened portion 20a of the parison 20 will be punctured to form an exhaust opening at the portion facing to the transversal opening 22 because there is no back support for the thickened portion 20a at this opening 22.

Figure 11A:
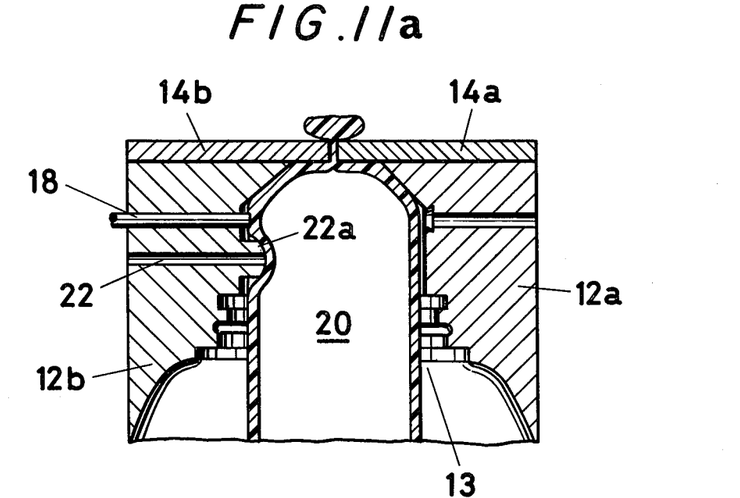
FIGS. 11a, 11b, 12 and 13 are views similar to FIGS. 9a, 9b, 9c and FIGS. 10a and 10b showing another examples of forming exhaust openings.
Figure 11B:
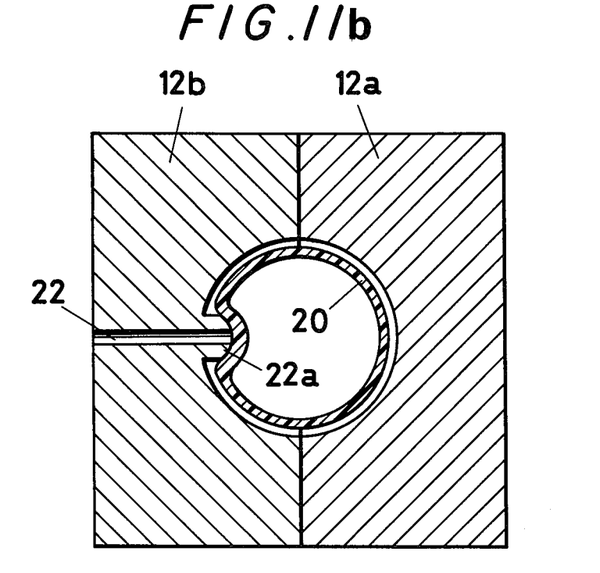

In still another modification shown in FIGS. 11a and 11b, a transversal exhaust opening 22 is provided through the upper end of the mold halves 12a and 12b, or at the portion of the molded article which is to be cut away later. In this case, the portion of the metal mold 22a at which the exhaust opening 22 opens to the inside of the cavity 13 is made to slightly protrude into the cavity. As best shown in FIG. 11b, the parison 20 is deformed such that the thickness of the wall thereof is partially increased by this protrusion 22a. As a result, in the same manner as above described, this thickened wall portion is prevented from being ruptured during the blow molding operation regardless of the provision of the exhaust opening 22. At the end of the molding operation, as the internal pressure increases further, the thickened wall portion of the parison will be punctured as there is no back support for this portion, thus forming an exhaust port.

Figure 13:
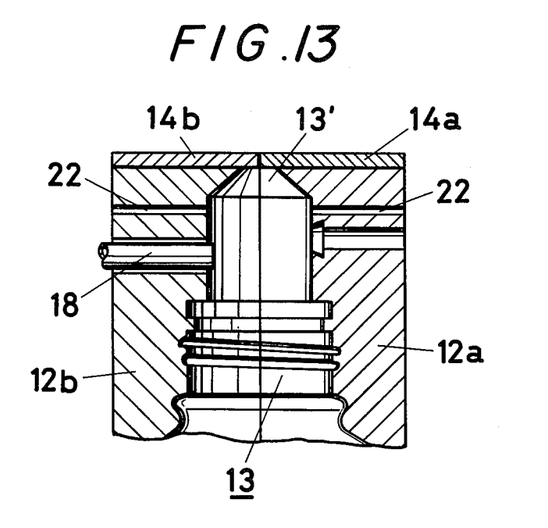

In another modification shown in FIG. 13, the diameter of the second cavity corresponding to the portion of the molded article to be cut away later is made considerably smaller than that of the cavity 13 so as to increase the thickness of the wall of the parison at that portion. Exhaust openings 22 are formed through the metal mold halves in the radial direction of the second cavity 13'. Again it is possible to form an exhaust opening through the thick wall portion of the parison after completion of the blow molding operation. Instead of providing two diametrically opposite exhaust openings 22 a single exhaust opening may be provided as in the preceding embodiments.

Figure 12:
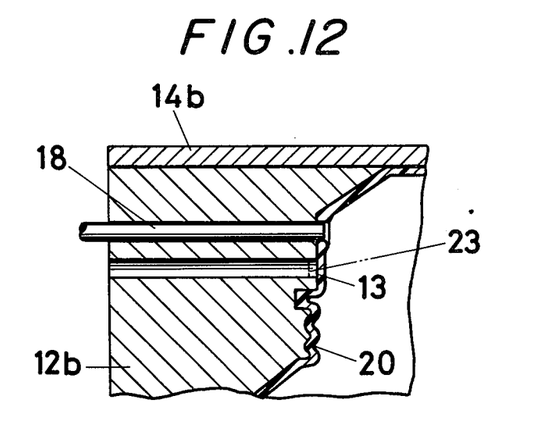

In the embodiment shown in FIG. 12, suitable valve means 23 is provided at the inner end of the exhaust opening 22 provided for the upper portion of the metal mold half 12b at which the exhaust opening 22 opens to the cavity 13. The valve means 23 is constructed to be opened after completion of the blow molding of the parison for forming an exhaust port communicating with the exhaust opening.

In the foregoing embodiments, an exhaust port is formed at the weakest portion of the molded article when the internal pressure therein exceeds a predetermined value. The position, diameter and number of the exhaust opening 22 are determined depending upon the configuration, wall thickness and material. Where the viscosity of the molten raw material is high, due consideration should be paid for the diameter of the exhaust port. More particularly, it is necessary to avoid the tendency of greatly increasing the discharged quantity over the quantity of the pressurized gas admitted into the parison, thus resulting in an undue decrease in the internal pressure which causes rejects to be formed.

The novel method of this invention has following advantages.

A. It has been necessary to make as far as possible thin and sharp the needle to be pierced through the wall of the parison. However, a thin needle decreases the speed of the pressurized gas blown into the parison. This problem can be efficiently solved by this invention because the needle is not required to pierce the wall of the parison. Since it is possible to use thicker nozzle tube it is possible not only to increase the speed of the pressurized gas blowing into the parison but also to increase the quantity of the exhausted gas, thus improving the cooling effect.

B. According to this invention, since a hollow needle does not pierce through the wall of the parison as in the prior art method, the number of rejects caused by insufficient piercing, and hence insufficient admission of the pressurized gas, can be greatly decreased.

C. Renewal of the worn out or broken needle is not necessary so that it is possible to improve the efficiency of the blow molding operation.

D. Since an exhaust port is formed through a portion of the molded article for effecting exhaust of the gas when the internal pressure is increased due to continuous admission of the pressurized gas, it is possible to enhance the cooling of the molded article and the mold. This decreases the period of one cycle of the molding operation, thereby increasing the molding speed.

E. In the prior art method, since the quantity of the exhausted gas is small there is a disadvantage that unpleasurable odor remains in the molded article. This problem can be solved by this invention.

F. The method of this invention can be readily carried out by an existing molding machine by merely substituting a hollow nozzle tube for the hollow needle having a sharp piercing end.

G. Since it is possible to greatly reduce the time required for exhausting the pressurized gas in the molded article it is possible to decrease the period of the molding cycle.

What is claimed is:

1. In a method of manufacturing a hollow plastic article of the type comprising the steps of extruding plastic material into a tube which is utilized to form unit parisons, accommodating each unit parison in a closed metal mold having a cavity therein, sealing the upper and lower ends of the unit parison accommodated in said metal mold, blowing pressurized gas into said sealed unit parison for blow molding the same in said metal mold, the improvements comprising the steps of:

transversely inserting a blunt nozzle tube through said metal mold until the inner end of said nozzle protrudes into said cavity 2 to 5 mm, but not through the side wall of said unit parison after the upper and lower ends of the unit parison have been sealed;

ejecting pressurized gas through said nozzle against the outside of the wall of said unit parison sealed in the metal mold, thereby forming a gas inlet opening through said side wall of the unit parison and inflating said unit parison against the inner wall of the cavity by the pressurized gas ejected into said unit parison through said inlet opening;

providing a transverse exhaust opening for said metal mold at a position corresponding to a portion of the molded article to be cut away after the hollow article has been formed;

providing a mold configuration at said transverse exhaust opening which will result in reduced stretching of the parison during said inflating and thereby forming that portion of the wall of the molded article at said transverse exhaust opening to be thicker than the rest of the wall of the molded article, said thicker portion being sufficiently thick to be sustained in a semi-solid state during blow molding of said article;

forming an exhaust port through said thicker wall portion by raising the internal pressure within the molded article until said semi-solid thicker wall portion is forced open at said exhaust opening;

retracting said blunt nozzle tube away from the molded article; and exhausting the pressurized gas from the molded article through said exhaust port and said transverse exhaust opening, thereby removing the gas from the molded article and enhancing the cooling thereof.

2. A method as claimed in claim 1, wherein the area of said thicker wall portion is adjustable.

3. In a method of manufacturing a hollow plastic article of the type comprising the steps of extruding plastic material into a tube which is utilized to form unit parisons, accommodating each unit parison in a closed metal mold having a cavity therein, sealing the upper and lower ends of the unit parison accommodated in said metal mold, blowing pressurized gas into said seated unit parison for blow molding the same in said cavity, and cooling and removing the molded article from said metal mold, the improvements comprising the steps of:

transversely inserting a blunt nozzle tube through said metal mold until the inner end of said nozzle protrudes into said cavity 2 to 5 mm, but not through the side wall of said unit parison after the upper and lower ends of the unit parison have been sealed;

ejecting pressurized gas through said nozzle against the outside of the wall of said unit parison sealed in the metal mold, thereby forming a gas inlet opening through said side wall of the unit parison and inflating said unit parison against the inner wall of the cavity by the pressurized gas ejected into said unit parison through said inlet opening;

providing a transverse exhaust opening for said metal mold at a position corresponding to a portion of the molded article to be cut away after the hollow article has been formed;

pinching at least one portion of the top wall of the molded article adjacent said exhaust opening to form a wall portion thicker than the rest of the wall of the molded article, said pinched thicker portion being sufficiently thick to be sustained in a semi-solid state during blow molding of said article, forming an exhaust port through said pinched thicker portion by raising the internal pressure within the molded article until said semi-solid pinched thicker portion is forced open at said exhaust opening;

retracting said blunt nozzle tube away from the molded article; and exhausting the pressurized gas from the molded article through said exhaust port and said transverse exhaust opening, thereby removing the gas from the molded article and enhancing the cooling thereof.

* * * * *